(12) United States Patent
Sabouri-Sichani et al.

(10) Patent No.: US 11,395,130 B2
(45) Date of Patent: Jul. 19, 2022

(54) COMMUNICATION OF USER TERMINAL HAVING MULTIPLE SUBSCRIPTION IDENTITIES

(71) Applicant: NOKIA SOLUTIONS AND NETWORKS OY, Espoo (FI)

(72) Inventors: Faranaz Sabouri-Sichani, Aalborg (DK); Frank Frederiksen, Klarup (DK); Kishore Krishne Gowda, Bangalore (IN); Nandagopal Peethambaran Nair Rajalakshmi, Karnataka (IN); Jitendra Kumar Saini, Karnataka (IN); Nanda Kumar, Bangalore (IN); Sambhram Kanavalli, Bangalore (IN); Nuno Manuel Kiilerich Pratas, Gistrup (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/192,678

(22) Filed: Mar. 4, 2021

(65) Prior Publication Data

US 2021/0282000 A1    Sep. 9, 2021

(30) Foreign Application Priority Data

Mar. 6, 2020   (FI) .................................... 20205242

(51) Int. Cl.
  *H04W 8/18* (2009.01)
  *H04W 60/00* (2009.01)
  *H04W 12/72* (2021.01)
  *H04W 4/02* (2018.01)
  (Continued)

(52) U.S. Cl.
  CPC ........... *H04W 8/183* (2013.01); *H04W 4/025* (2013.01); *H04W 8/24* (2013.01); *H04W 12/72* (2021.01); *H04W 68/005* (2013.01)

(58) Field of Classification Search
  None
  See application file for complete search history.

(56) References Cited

U.S. PATENT DOCUMENTS

2013/0303203 A1   11/2013   Wang et al.
2014/0274047 A1    9/2014   Dhanda et al.
2015/0065132 A1    3/2015   Ramkumar et al.
      (Continued)

FOREIGN PATENT DOCUMENTS

CN   108650672 A   10/2018
CN   109672979 A    4/2019
      (Continued)

OTHER PUBLICATIONS

Office Action dated Jun. 18, 2020 corresponding to Finnish Patent Application No. 20205242.
Finnish Search Report dated Jun. 18, 2020 corresponding to Finnish Patent Application No. 20205242.
Communication of Acceptance under section 29a of Patents Decree dated Aug. 26, 2020 corresponding to Finnish Patent Application No. 20205242.
(Continued)

*Primary Examiner* — Gary Lafontant
(74) *Attorney, Agent, or Firm* — Squire Patton Boggs (US) LLP

(57) ABSTRACT

Apparatuses and methods in a communication system are provided. A method comprises: maintaining in a terminal more than one subscription identities and controlling by the user terminal transmission of a message comprising information that the terminal maintains more than one subscription identities.

14 Claims, 8 Drawing Sheets

(51) Int. Cl.
*H04W 8/24* (2009.01)
*H04W 68/00* (2009.01)

(56) References Cited

U.S. PATENT DOCUMENTS

| | | | |
|---|---|---|---|
| 2015/0098445 A1 | 4/2015 | Chakravarthy et al. | |
| 2016/0088462 A1* | 3/2016 | Jin | H04W 8/08 455/456.5 |
| 2018/0160422 A1 | 6/2018 | Pathak et al. | |
| 2021/0037377 A1* | 2/2021 | Jia | H04W 28/16 |
| 2021/0227376 A1* | 7/2021 | Jha | H04W 76/16 |

FOREIGN PATENT DOCUMENTS

| | | |
|---|---|---|
| CN | 110463238 A | 11/2019 |
| CN | 110495195 A | 11/2019 |
| JP | 2020-25212 A | 2/2020 |
| KR | 10-2016-0065143 A | 6/2016 |
| WO | 2016/118248 A1 | 7/2016 |
| WO | WO 2017/211424 A1 | 12/2017 |

OTHER PUBLICATIONS

Extended European Search Report corresponding to EP Application No. 21154886.2, dated Jul. 1, 2021.
3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15); 964 pages.
Korean Notice of Preliminary Rejection corresponding to KR Application No. 2021-0028834, dated Jul. 28m 2021.
Japanese Office Action corresponding to JP Application No. 2021-034320, dated Aug. 18, 2021.
Chinese Office Action corresponding to CN Application No. 202110244996.0, dated Feb. 28, 2022.
Korean Office Action corresponding to KR Application No. 10-2021-0028834, dated Mar. 5, 2022.
Japanese Office Action with English language summary, corresponding to JP Application No. 2021-034320, dated May 17, 2022.

* cited by examiner

COMMUNICATION OF USER TERMINAL HAVING MULTIPLE SUBSCRIPTION IDENTITIES

FIELD

The exemplary and non-limiting embodiments of the invention relate generally to wireless communication systems. Embodiments of the invention relate especially to apparatuses and methods in wireless communication networks.

BACKGROUND

Wireless communication systems in usually comprise wireless user terminals, a radio access network and a core network. These components of the system exchange messages to establish a signaling connection between them to facilitate data transfer from one communication point to another communication point. The message exchange between different components of the system should be as reliable and efficient regarding the use of communication system resources as possible.

Wireless communication systems are under constant development. One aspect under development is user terminals having more than one subscription identities. There may be users who have the need to utilise more than one subscription in a same terminal. For example, one subscription maybe for home use and another for work. The communication system should be prepared to handle these situations in an efficient manner.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided methods of claims 1 and 5.

According to an aspect of the present invention, there are provided apparatuses of claims 8 and 10.

According to an aspect of the present invention, there are provided computer programs comprising instructions of claims 13 and 14.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
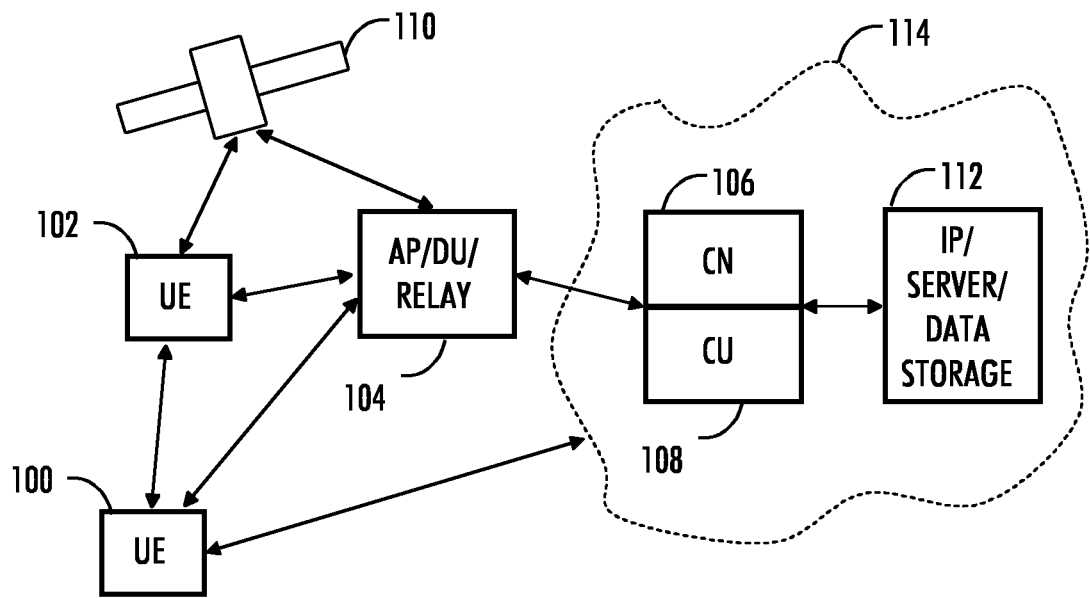

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
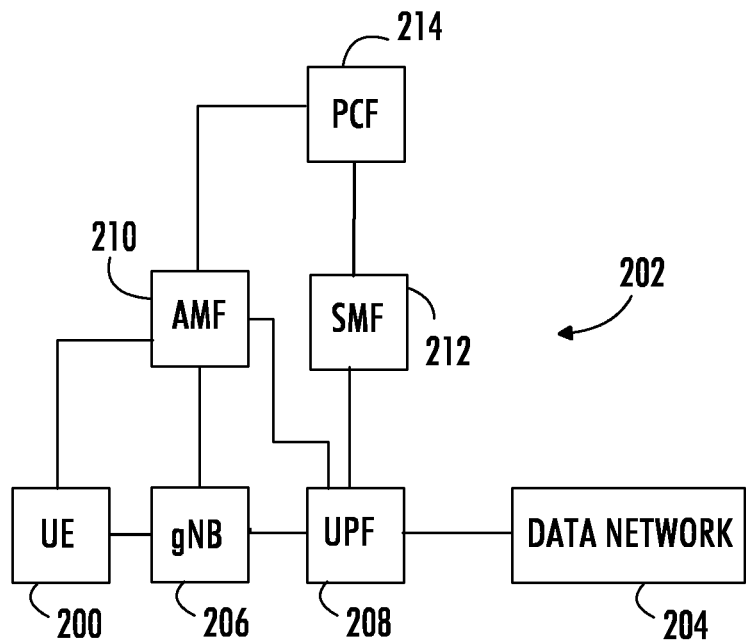

FIG. 2 illustrates an example of a communication system based on 5G network components. A user terminal or user equipment 200 communicating via a 5G network 202 with a data network 204. The user terminal 200 is connected to a base station or gNB 206 which provides the user terminal a connection to data network 204 via one or more User Plane Functions 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release and a Policy Control Function 214 which is configured to govern network behavior by providing policy rules to control plane functions.

Each user terminal (or user equipment, UE) hardware has unique identifier. The identifier may be denoted as the permanent equipment identifier, PEI, or international mobile equipment identifier, IMEI.

A user terminal wishing to utilise services of a wireless communication system such as a cellular network, needs to have a subscription from the operator of the communication system. Typically, a subscription is bounded to a physical Universal Subscriber Identity Module, USIM, card and the subscription can be identified by a unique subscription permanent identifier, SUPI, denoted also an international mobile subscriber identity, IMSI. SUPI consists of the mobile country code (MCC), mobile network code (MNC), and the mobile subscription identification number (MSIN).

There are also so-called embedded USIMs or electronic SIMs, eSIM, available. An eSIM is a digital USIM that allows the owner to activate a subscription to a communication system without having to use a physical USIM card.

In most cases, a user terminal has only one subscriber identity, stored in the USIM card inserted in the terminal. However, there a numerous user terminal on the market which have more than one slot for USIM cards and are capable of supporting multiple subscriber identities. Those user terminals may be denoted as multi-USIM (MUSIM) devices.

While a MUSIM device has a separate SUPI corresponding to each of its USIM cards it should only have a unique permanent equipment identifier, PEI referring to the device hardware itself. However, currently there is no requirement preventing a MUSIM device to have more than one PEI as well. Hence, some MUSIM device vendors have chosen to specify two (or more) distinct PEIs as well. This will currently prevent the communication systems to apply PEI as an indicator for MUSIM devices. Therefore, the communication systems are unable to easily determine whether a user terminal hardware comprises a multitude of subscriber identities.

Thus, an MUSIM user terminal has two (dual) or more (multiple) simultaneous network subscriptions and may also have multiple corresponding PEIs each associated with a particular USIM belonging to the same or different Mobile Network Operator, MNO, or Mobile Network Virtual Operator, MNVO, and may be using two neighbouring or co-located cells from each operator as serving cells.

A MUSIM user terminal may be registered to the network and be in any of the RRC states RRC_idle, RRC_inactive, or RRC_connected with one or more subscription identities. When the network infrastructure is not aware that these multiple subscription identities are co-located in the same MUSIM device, the network will be unable to optimize certain procedures and instead will treat each subscription identity of the user terminal independently.

One example of the impacted procedures is paging. For example, there may be a situation where subscription identity A (or USIM A) is connected to the network (RRC_CONNECTED), and there is a need for paging another subscription identity B (or USIM B) maintained by the same user terminal. Then even though both USIMs are in the same geographical area, the network associated with USIM B will still broadcast the paging message to all the cells of all base stations within the USIM B tracking area. In other words, the USIM B network is not able to take advantage of the location information of the UE, which the USIM A network has available. This causes waste of network resources.

In an embodiment, a mechanism is proposed that enables the networks associated with each of the USIMs of a user terminal to become aware of the MUSIM capabilities of the user terminal and be able to use this information in their procedures.

Figure 3:
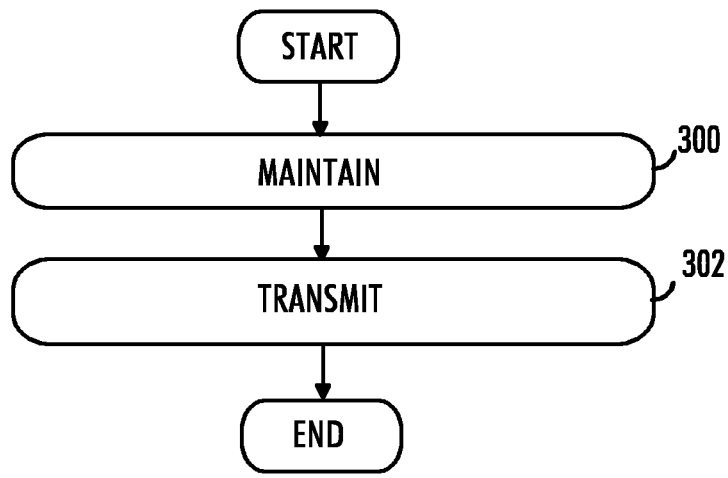
FIGS. 3 and 4, are flowcharts illustrating embodiments of the invention.

The flowchart of FIG. 3 illustrates an embodiment. The flowchart illustrates an example of the operation of an MUSIM user terminal.

In step 300, the user terminal maintains more than one subscription identities. Thus, the user terminal may comprise multiple USIMs. These subscription identities may be related to one operator of a communication network or they may be related to different operators.

In step 302, the user terminal is configured to control transmission of a message comprising information that the user terminal maintains more than one subscription identities.

In an embodiment, the message is transmitted to the network one of the subscription identities is associated with.

In an embodiment, the message is an initial registration request or initial context setup of one of the subscription identities of the user terminal.

In an embodiment, the procedure may be one-phase procedure, where the user terminal includes in its capability report the details of the subscription identities maintained by the terminal. For example, the message may comprise the subscription permanent identities, SUPI, stored in the user terminal.

In another embodiment, the procedure may be two-phase procedure, where the user terminal may just indicate to the network that multiple identities are maintained. The network may then later request more information on the identities if needed.

In an embodiment, the message is a connection establishment request of one of the subscription identities of the user terminal. The user terminal maintaining multiple subscriptions may report during the initial connection establishment procedure (the transition from RRC Idle/Inactive to RRC Connected) of one of the subscription identities of the user terminal that it is an MUSIM user terminal.

In an embodiment, this report may be performed as one-phase procedure, where the user terminal includes in its RRC messaging details of the multiple subscriptions (for example by including in the RRCSetupRequest the subscription permanent identifier (SUPI) or equivalent information regarding the USIMs in the user terminal).

In another embodiment, this report may be performed as two-phase procedure, where during the initial access message exchanges the user terminal informs the network about the multiple subscriptions via a flag (a single bit in the RRCSetupRequest, for example) and then the network may ask for more detailed information about the multiple subscriptions via e.g. the RRC UECapabilityEnquiry.

Figure 4:
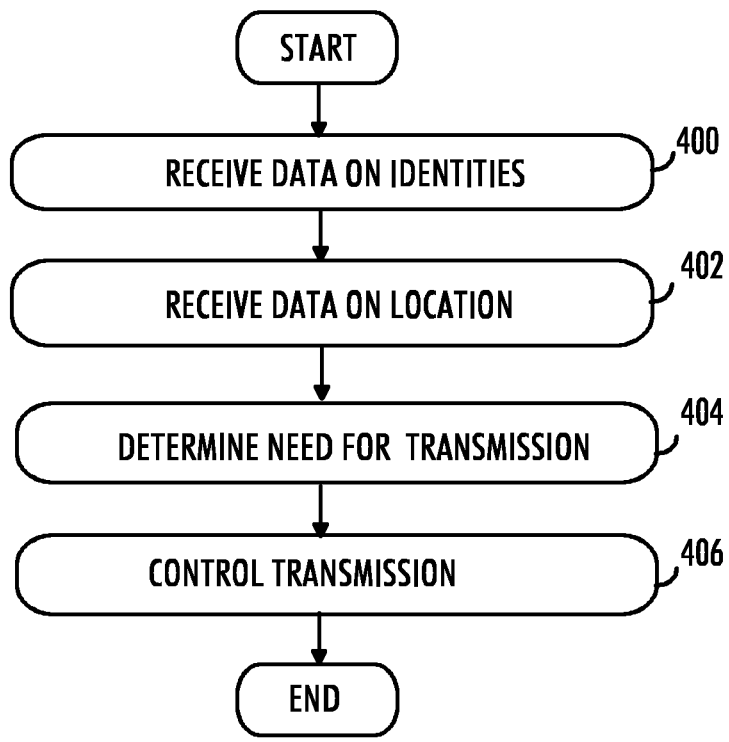

The flowchart of FIG. 4 illustrates an embodiment. The flowchart illustrates an example of the operation on the network side communicating with an MUSIM user terminal.

In step 400, the network element receives information that the user terminal comprises more than one subscription identities.

In step 402, the network element receives the location data of the user terminal based on information obtained from one of the subscription identities of the user terminal.

In step 404, the network element determines that there is data to be sent to another subscription identity of the user terminal.

In step 406, the network element controls, based on the location data, transmission of a paging message to the another subscription identity.

In an embodiment, the network operation in connection with paging a user terminal maintaining multiple subscription identities may utilise the known location of one of the subscription identities of the user terminal. If the cell where the user terminal is known based on one of the subscription identities, then when a need to transmit data to some other subscription identity of the user terminal arises information about the cell may be utilised to limit paging of the user terminal to the cell where it is known to be.

Thus, if cell location of any other subscription identity of the user terminal is known to access network and/or core network, the targeted paging message can be sent only to that specific cell instead of paging broadcast to all cells of all base stations from the user terminal's tracking area.

Figure 5A:
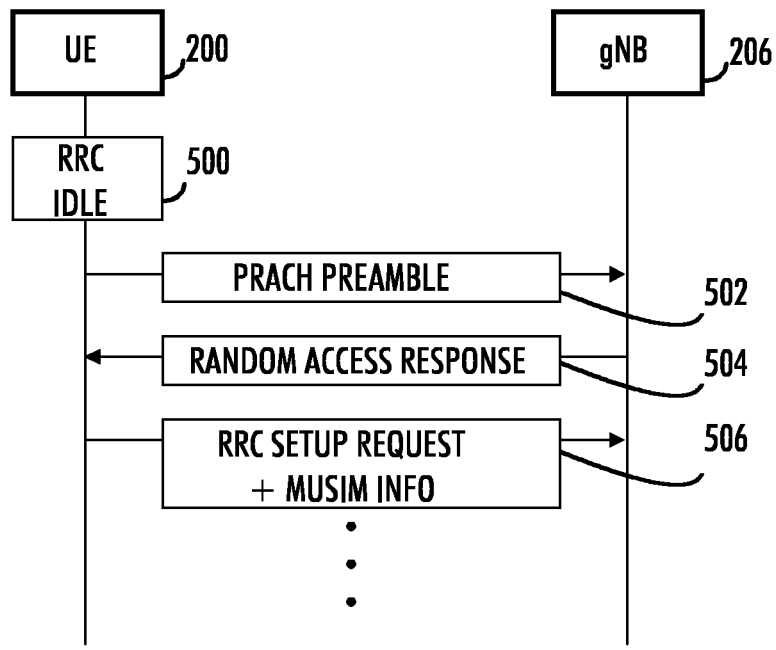
FIGS. 5A, 5B, 6A, 6B, 7A, 7B, 8A and 8B are signalling charts illustrating embodiments of the invention
Figure 5B:
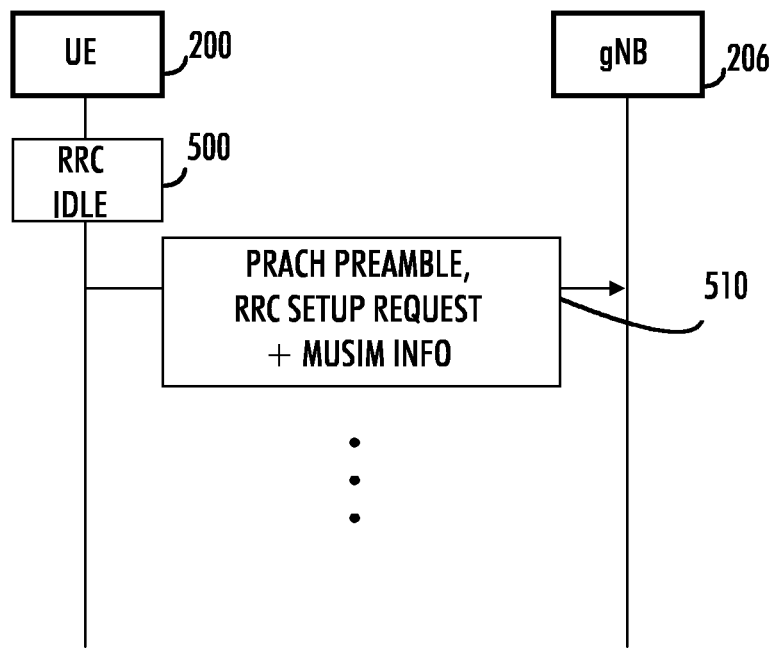

FIGS. 5A and 5B illustrate examples of informing the network about the user terminal being a multi-USIM device. The charts of FIGS. 5A and 5B illustrate example signalling between user terminal 200 and access point gNB 206 in one-phase approach.

In the example of FIG. 5A, in the beginning the user terminal is in RRC idle 500 state. The user terminal 200 transmits a message (Physical Random Access Channel, PRACH, preamble) 502 to gNB 206. The gNB responds with a message (Random Access Response) 504. The user terminal transmits Msg 3 (Radio Resource Control, RRC, Resource Setup Request) 506.

In the example of FIG. 5B, in the beginning the user terminal is in RRC idle 500 state. The user terminal 200 transmits Msg A (PRACH preamble and RRC, Resource Setup Request) 510 to gNB 206.

In an embodiment, in the one-phase approach, the UE includes in either the RRCSetupRequest message 506, 510 or via a dedicated Medium access control, MAC, layer protocol data unit, PDU, the full details regarding the other subscription identity of the user terminal. This information is exchanged with the network as part of the connection establishment procedure.

Figure 6A:
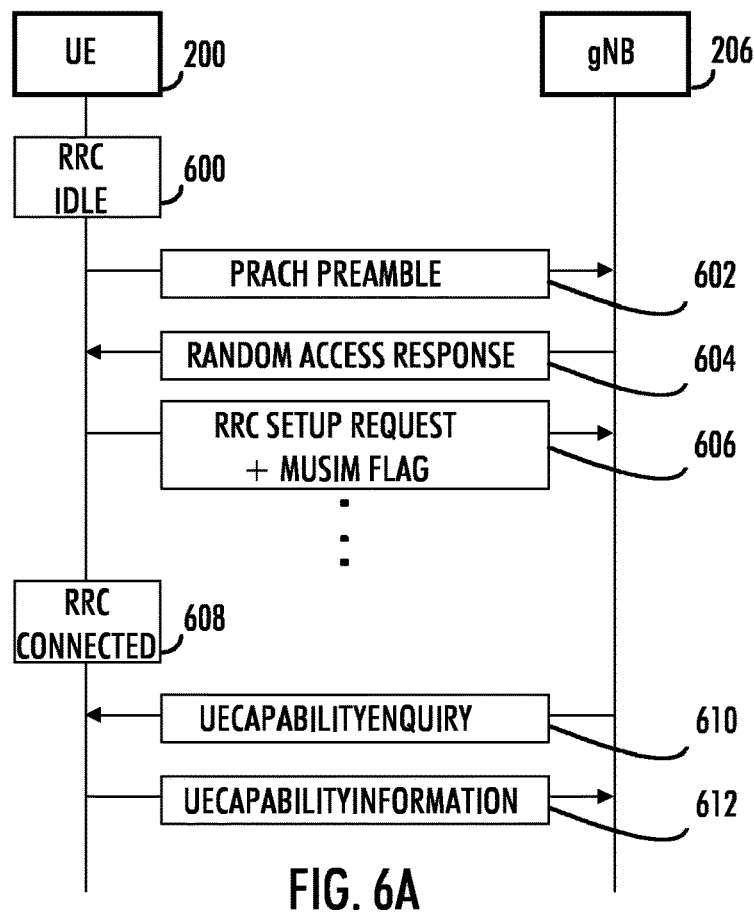
Figure 6B:
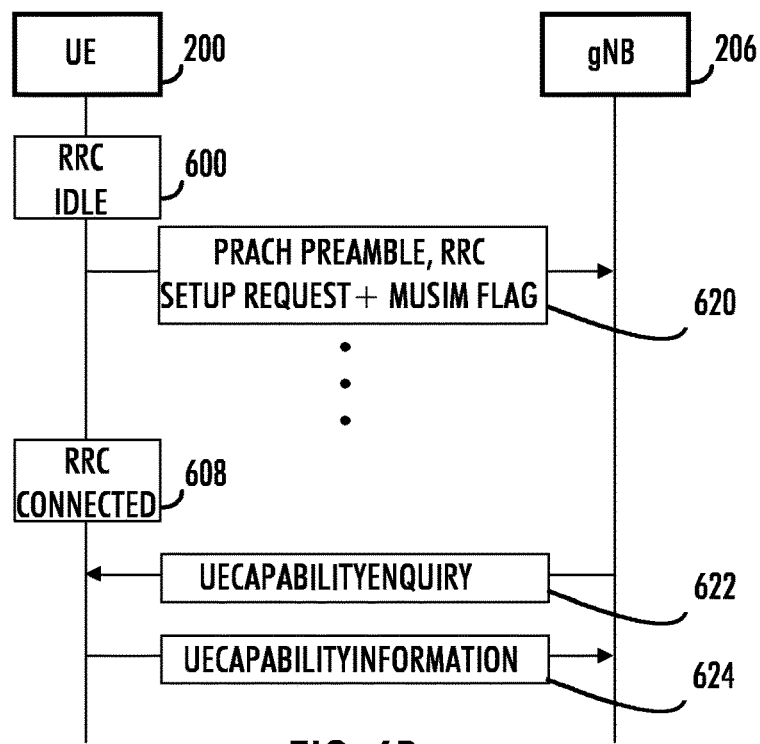

FIGS. 6A and 6B illustrate examples of informing the network about the user terminal being a multi-USIM device.

The charts of FIGS. 6A and 6B illustrate example signalling between user terminal 200 and access point gNB 206 in two-phase approach.

In the example of FIG. 6A, in the beginning the user terminal is in RRC idle 600 state and moves to RRC_connected with a 4-step RACH procedure. The user terminal 200 transmits a message (PRACH preamble) 602 to gNB 206. The gNB responds with a message (Random Access Response) 604. The user terminal transmits Msg 3 with an added flag indicating the UE is a MUSIM device (RRC Resource Setup Request+MUSIM flag) 606.

When the user terminal is moved to RRC Connected state 608 gNB 206 requires more information about the subscription identities of the user terminal and transmits UECapabilityEnquiry (MUSIM Info enquiry) 610 to the user terminal. The user terminal responds with UECapabilityInformation (MUSIM Info) 612 which comprises information on the subscription identities of the user terminal.

In the example of FIG. 6B, in the beginning the user terminal is in RRC idle 600 state and moves to RRC_connected with a 2-step RACH procedure. The user terminal 200 transmits MsgA with an added flag indicating the UE is a MUSIM device (PRACH preamble, RRC Resource Setup Request+MUSIM flag) 620 to gNB 206.

When the user terminal is moved to RRC Connected state 608 gNB 206 requires more information about the subscription identities of the user terminal and transmits UECapabilityEnquiry (MUSIM Info enquiry) 622 to the user terminal. The user terminal responds with UECapabilityInformation (MUSIM Info) 624 which comprises information on the subscription identities of the user terminal.

In the two-phase approach the user terminal is configured to include in either the RRCSetupRequest message or via a dedicated MAC PDU flag (e.g. one bit) that indicates that the user terminal has more than one subscription identity. The gNB can then decide at a later time if it requires information about the other subscription identities maintained by the user terminal. The information may be acquired via the user terminal capability transfer functionality.

Figure 7A:
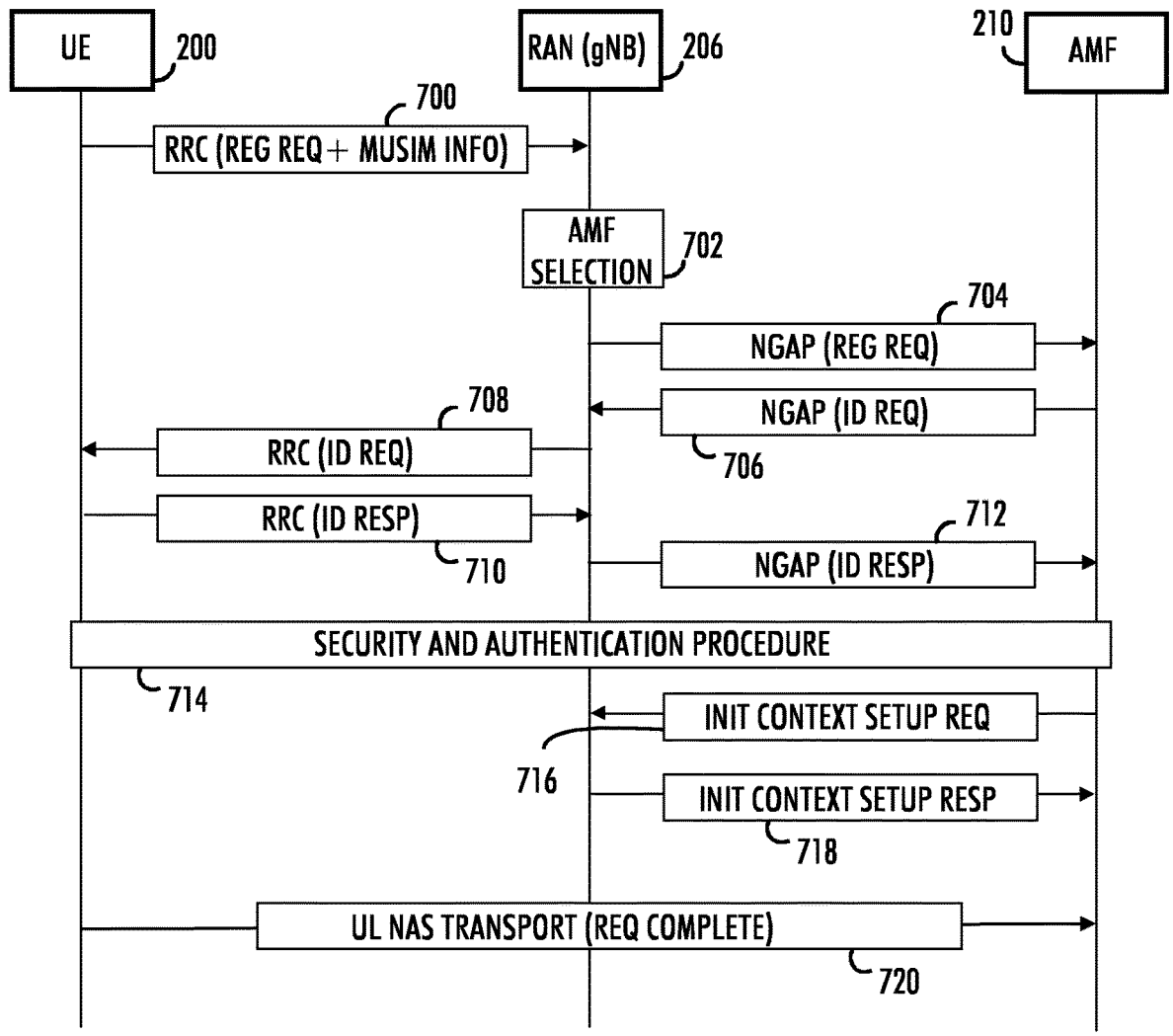
Figure 7B:
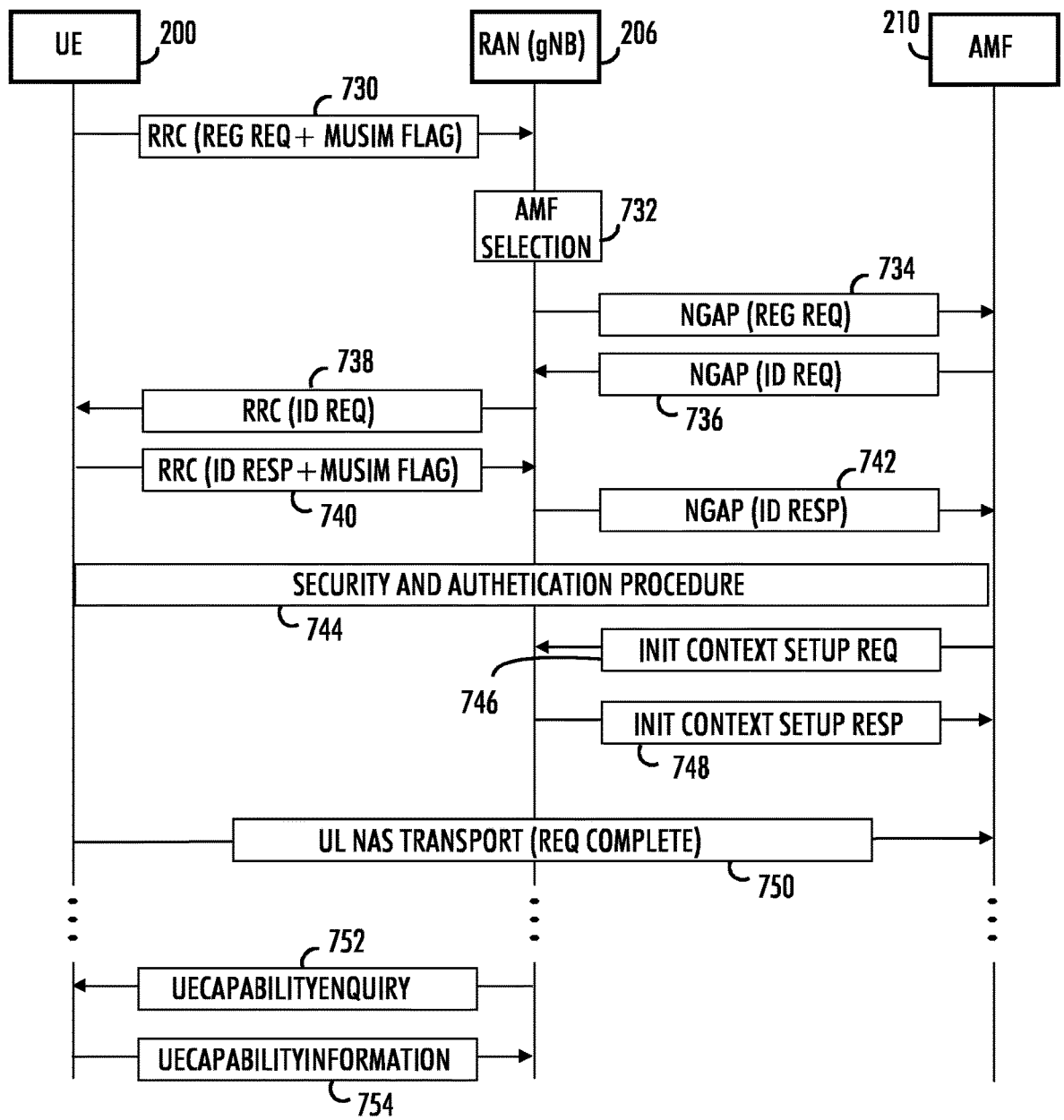

FIGS. 7A and 7B illustrates an example of a high-level signaling procedure for passing the information to the network using initial registration procedure of a user terminal. A user terminal maintaining multiple subscription identities can inform the network about its MUSIM capability in the initial Registration Request or Identity Response of one of the subscription identities. In addition, it may also add information about its other subscription identities.

In the one-phase approach the complete information can be added to the first message. This is illustrated in FIG. 7A. The figure illustrates an example of signalling between user terminal 200, radio access network gNB 206 and AMF 210.

The user terminal 200 transmits an RRC registration request message 700 to the radio access network regarding one of the subscription identities of the user terminal. In an embodiment, the registration request message already contains parameters indicating the user terminal radio capabilities and mobility management capabilities. This can be extended or modified to carry information about the subscription identities of the user terminal and information about the other subscription identities (such as SUPI, cell ID for camping/serving cell if available, for example).

The rest of the procedure goes as follows:

The gNB 206 selects 702 Access and Mobility Management Function, AMF 210 and transmits Next Generation Application Protocol, NGAP, registration request message 704 to AMF, which responds with NGAP identity request message 706. The gNB transmits RRC identity request message 708 to the user terminal which responds with RRC identity response message 710, which the gNB transmits 712 to the AMF.

Then follows security and authentication procedure 714 across user terminal, radio access network, authentication server, AUSF, and unified data management, UDM, network function.

The AMF transmits initial context setup request (registration accept) message 716 to gNB, which responds 718 with initial context setup response. Finally, the user terminal transmits a registration complete message 720 to the AMF.

When one-phase protocol is used (as described above in connection with FIGS. 6A and 6B), then the information about multiple subscription identities of the user terminal may be included into RRC Setup Request message transmitted by the user terminal. In an embodiment, the information may be integrated into the RRC Setup Request message by redefining the RRCSetupRequest Information Element, IE, to include information such as the other USIM identifiers and the cell IDs of where the other USIM's are camping/serving. An example of modified RRCSetupRequest IE is as follows:

```
-- ASN1START
-- TAG-RRCSETUPREQUEST-START
RRCSetupRequest ::= SEQUENCE {
rrcSetupRequest RRCSetupRequest-IEs
}
RRCSetupRequest-IEs ::= SEQUENCE {
ue-Identity InitialUE-Identity,
establishmentCause EstablishmentCause,
spare BIT STRING (SIZE (1))
}
InitialUE-Identity ::= CHOICE {
ng-5G-S-TMSI-Part1 BIT STRING (SIZE (39)),
randomValue BIT STRING (SIZE (39))
}
EstablishmentCause ::= ENUMERATED {
emergency, highPriorityAccess, mt-Access, mo-Signalling,
mo-Data, mo-VoiceCall, mo-VideoCall, mo-SMS, mps-PriorityAccess,
mcs-PriorityAccess, spare6, spare5, spare4, spare3, spare2, spare1}
-- TAG-RRCSETUPREQUEST-STOP
-- ASN1STOP
```

In another embodiment, the information about multiple subscription identities of the user terminal may be provided as part of the RRC Setup Complete message, by redefining RRC Setup Complete:

```
- ASN1START
-- TAG-RRCSETUPCOMPLETE-START
RRCSetupComplete ::= SEQUENCE {
rrc-TransactionIdentifier RRC-TransactionIdentifier,
criticalExtensions CHOICE {
rrcSetupComplete RRCSetupComplete-IEs,
criticalExtensionsFuture SEQUENCE { }
}
}
RRCSetupComplete-IEs ::= SEQUENCE {
selectedPLMN-Identity INTEGER (1..maxPLMN),
registeredAMF RegisteredAMF OPTIONAL,
guami-Type ENUMERATED {native, mapped} OPTIONAL,
s-NSSAI-List SEQUENCE (SIZE (1..maxNrofS-NSSAI)) OF
S-NSSAI OPTIONAL, dedicatedNAS-Message DedicatedNAS-Message,
ng-5G-S-TMSI-Value CHOICE {
ng-5G-S-TMSI NG-5G-S-TMSI,
```

-continued

```
ng-5G-S-TMSI-Part2 BIT STRING (SIZE (9))
} OPTIONAL,
lateNonCriticalExtension OCTET STRING OPTIONAL,
nonCriticalExtension SEQUENCE{ } OPTIONAL
}
RegisteredAMF ::= SEQUENCE {
plmn-Identity PLMN-Identity OPTIONAL,
amf-Identifier AMF-Identifier
}
-- TAG-RRCSETUPCOMPLETE-STOP
```

In two-phase approach the user terminal first includes in either the initial registration request or the identity response message indication that the user terminal maintains multiple subscription identities. This is illustrated in the example of FIG. 7B. In an embodiment, this information can be made available to the RAN explicitly by AMF. The AMF or gNB can then decide later if it requires information about the other subscription identities at the UE and can query information as shown in FIG. 7B.

The user terminal 200 transmits an RRC registration request message 730 to the radio access network 206 regarding one of the subscription identities of the user terminal. In an embodiment, the registration request message contains an indication such as a one-bit flag that the user terminal maintains multiple subscription identities.

The gNB 206 selects 732 Access and Mobility Management Function, AMF 210 and transmits Next Generation Application Protocol, NGAP, registration request message 734 to AMF, which responds with NGAP identity request message 736. The gNB transmits RRC identity request message 738 to the user terminal.

The user terminal responds with RRC identity response message 740, which the gNB transmits 742 to the AMF. In an embodiment, if MUSIM capability of the user terminal was not indicated in the RRC registration request message 730, the identity response message 740 may contain an indication such as a one bit flag that the user terminal maintains multiple subscription identities.

The gNB transmits 742 identity response message to the AMF. Then follows security and authentication procedure 744 across user terminal, radio access network, authentication server, AUSF, and unified data management, UDM, network function.

The AMF transmits initial context setup request (registration accept) message 746 to gNB, which responds with initial context setup response 748. The user terminal transmits a registration complete message 750 to the AMF.

Some later time the gNB may request further information regarding multiple subscription identities of the user terminal by transmitting a capability enquiry message 752 to the user terminal, which responds with capability information message 754.

When two-phase procedure is used ((as described above in connection with FIGS. 7A and 7B), then a flag indicating multiple subscription identities of the user terminal may be included into the RRC Setup Request message, and the actual MUSIM information may be exchanged via the user terminal capability enquiry signaling procedure.

In an embodiment, the flag indicating multiple subscription identities may be either included into the RRC Setup Request message (i.e. as a flag in the RRCSetupRequest-IEs) or into the RRC Setup Complete message (i.e. as a flag in the RRCSetupComplete-IEs), for example.

In an embodiment, exchanging of the full MUSIM information may make use of an existing RRC message UECapabilityEnquiry from RAN to user terminal and the corresponding response from the user terminal. The UECapabilityEnquiry signaling procedure itself exists already and is defined in 3GPP TS 38.331 for New Radio, but currently it does not include any information about multiple subscription identities of a user terminal.

In an embodiment, a specific MUSIM information is added into this procedure. The information may include SUPI and the cell ID of the other USIM's camping/serving cell if available. Also, other information regarding multiple subscription identities may be added.

Changes in the UECapabilityEnquiry message itself are required to indicate that the network wants to know more about the multiple subscription identities of the user terminal. In an embodiment, a new field may be added into the UE-CapabilityRequestFilterCommon Information Element as follows

```
-- ASN1START
-- TAG-UECAPABILITYENQUIRY-START
UECapabilityEnquiry ::= SEQUENCE {
rrc-TransactionIdentifier RRC-TransactionIdentifier,
criticalExtensions CHOICE {
ueCapabilityEnquiry UECapabilityEnquiry-IEs,
criticalExtensionsFuture SEQUENCE { }
}
}
UECapabilityEnquiry-IEs ::= SEQUENCE {
ue-CapabilityRAT-RequestList UE-CapabilityRAT-RequestList,
lateNonCriticalExtension OCTET STRING OPTIONAL,
ue-CapabilityEnquiryExt OCTET STRING
 (CONTAINING UECapabilityEnquiry-v1560-IEs)
OPTIONAL
}
UECapabilityEnquiry-v1560-IEs ::= SEQUENCE {
capabilityRequestFilterCommon UE-
 CapabilityRequestFilterCommon OPTIONAL, --
Need N
  nonCriticalExtension SEQUENCE{ } OPTIONAL
}
-- TAG-UECAPABILITYENQUIRY-STOP
-- ASN1STOP
```

In an embodiment, in the UECapabilityInformation message (which is the reply to the UECapabilityEnquiry) there is the need to include information on the multiple subscription identities of the user terminal. In an embodiment, a new container may be added into UE-CapabilityRAT-ContainerList Information element, as follows

```
-- ASN1START
-- TAG-UECAPABILITYINFORMATION-START
UECapabilityInformation ::= SEQUENCE {
rrc-TransactionIdentifier RRC-TransactionIdentifier,
criticalExtensions CHOICE {
ueCapabilityInformation UECapabilityInformation-IEs,
criticalExtensionsFuture SEQUENCE { }
}
}
UECapabilityInformation-IEs ::= SEQUENCE {
ue-CapabilityRAT-ContainerList UE-CapabilityRAT-ContainerList
OPTIONAL,
lateNonCriticalExtension OCTET STRING OPTIONAL,
nonCriticalExtension SEQUENCE{ } OPTIONAL
}
-- TAG-UECAPABILITYINFORMATION-STOP
-- ASN1STOP
```

Utilising above described procedures, for example, the network one of the subscriber identities of user terminal is connected to will be aware of the multiple subscription identities of the user terminal along with the information about other USIMs of the user terminal. Based on the obtained information it may perform paging procedures, for example. The obtained information may comprise update of the serving cell ID for the USIM in RRC_Connected mode and potentially the exchange of Global Navigation Satellite System, GNSS, information. This information can then be used to localize the paging messages to a smaller set of cells than the ones composing a tracking area.

There are two different cases, one where the multiple subscriber identities of a user terminal belong to same network operator and one where the multiple subscriber identities of a user terminal belong different network operators.

Assuming for simplicity, that there are two subscriber identities in a user terminal, USIM-1 and USIM-2 and they both belong to same network operator. In this case, when USIM-1 updates it's serving cell-ID to a network node, since USIM-2 also belongs to same operator, exact cell location is already known in the network and paging message can be sent to targeted cell only.

Assume next a case where two subscriber identities in a user terminal, USIM-1 and USIM-2, belong to different network operators, Operator-A and Operator-B and where USIM-1 is in connected state and has updated its serving cell-ID to the network nodes of USIM-2. In such a case, even though the serving cell ID of USIM-1 is known by network nodes of Operator-2, it does not give information about the geographical location of the cell-id. For Operator-B to be able to know this information, Operator-A and Operator-B need to have an agreement to share "Serving cell location" with each other in case when a user terminal with multiple subscriber identities USIMs from both the operators. Operator-A and Operator-B may decide to share such information in advance (for a specific region or it by a message exchange dynamically, for example).

In case the network cannot extract location info from the cell-ID the GNSS-coordinates may be used to map the geographical location of the user terminal with the radio access network to be used for paging.

Figure 8A:
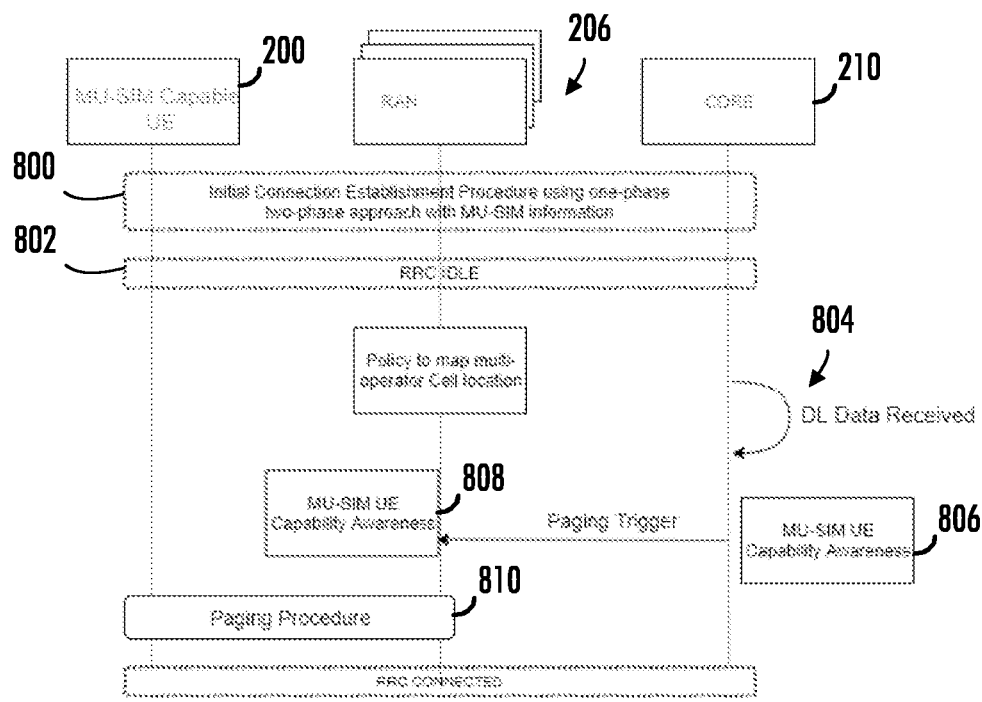

FIG. 8A illustrates an example of signaling exchanges associated the MUSIM aware RAN paging. Let us assume for simplicity that the user terminal 200 has two subscriber identities, USIM-1 and USIM-2. The procedure is similar regardless of the number of subscriber identities.

In the initial connection establishment procedure 800 of USIM-1 using either one-phase or two-phase approach, the radio access network 206 and core network 210 obtain and store information on the two subscriber identities of the user terminal 200. Upon the user terminal's transition to RRC-_connected with USIM-1 it provides the information about USIM-1's Network ID and the serving cell's cell-ID to all the nodes it is camped on with the USIM-2. This information is forwarded to the core network and stored there.

At this phase, USIM-2 is in RRC_IDLE state 802.

Upon receiving 804 downlink, DL, data for USIM-2 of the user terminal, the core network 210 performs lookup for corresponding user terminal information.

The core network 210 checks 806 if any of the other USIMs from the user device 200 is in "CONNECTED" state (in this case, USIM-1) and cell_info and/or GPS location info is available from the user terminal. If yes, the core network is configured to trigger paging only for the RAN node 808 where the user terminal device is connected to.

The RAN node, upon receiving the paging trigger for the user terminal, checks cell location of the RRC_connected USIM-1. Paging message is sent only to that specific cell.

This optimizes paging resource usage 810 by sending paging message only to specific cell, if any of the USIMs is in connected state and paging needs to be performed for another USIM in the MUSIM device.

A shared RAN is a technique where a set of radio base stations are shared by a hosting RAN provider for use by different participating operators/networks. The RAN sharing is influenced by factors including technical, business, network deployment and regulatory conditions.

Figure 8B:
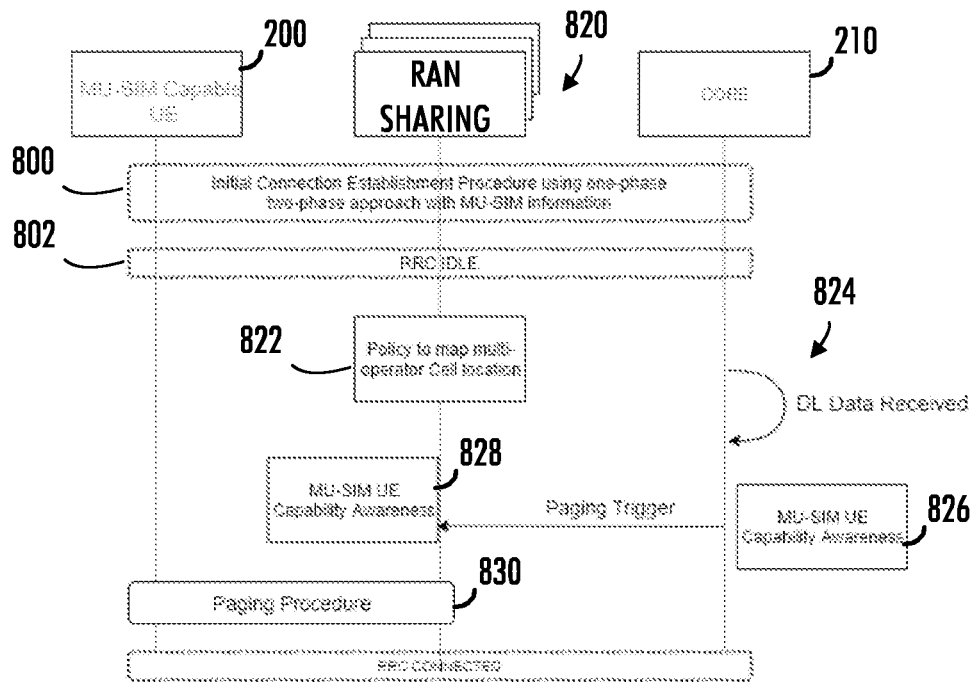

FIG. 8B illustrates an example of signaling exchanges associated with the MUSIM aware RAN paging where RAN sharing is applied. Let us assume for simplicity that the user terminal 200 has two subscriber identities, USIM-1 and USIM-2. The procedure is similar regardless of the number of subscriber identities.

In the initial connection establishment procedure 800 of USIM-1 using either one-phase or two-phase approach, the radio access network 820 and core network 210 obtain and store information on the two subscriber identities of the user terminal 200.

The operator configures 822 a policy to map cell location across multiple operators using the shared RAN.

Upon receiving 824 downlink, DL, data for USIM-2 of the user terminal, the core network 210 performs lookup for corresponding user terminal information.

The core network 210 checks 826 if any of the other USIMs from the user device 200 is in "CONNECTED" state (in this case, USIM-1) and cell_info and/or Global Positioning System, GPS, location info is available from the user terminal. If yes, the core network is configured to trigger paging only for the RAN node 828 where the user terminal device is connected to.

The RAN node, upon receiving the paging trigger for the user terminal, checks cell location of the RRC_connected USIM-1. Paging message is sent only to that specific cell.

This optimizes paging resource usage 830 by sending paging message only to specific cell, if any of the USIMs is in connected state and paging needs to be performed for another USIM in the MUSIM device.

Figure 9:
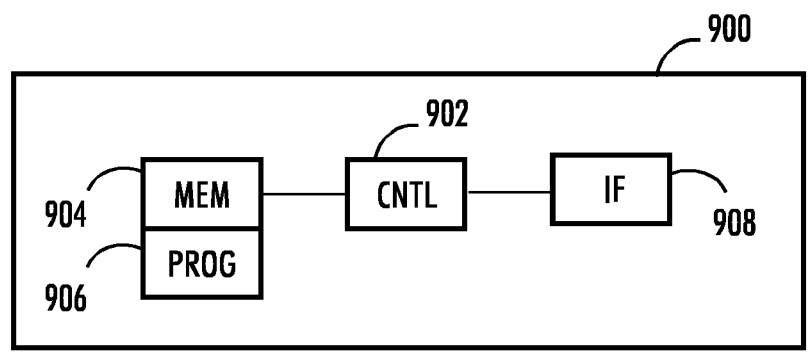
FIGS. 9 and 10 illustrate simplified examples of apparatuses applying embodiments of the invention.

FIG. 9 illustrates an embodiment. The figure illustrates a simplified example of an apparatus or network element applying embodiments of the invention. In some embodiments, the apparatus may be a network element or a part of a network element.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 900 of the example includes a control circuitry 902 configured to control at least part of the operation of the apparatus.

The apparatus may comprise a memory 904 for storing data. Furthermore, the memory may store software 906 executable by the control circuitry 902. The memory may be integrated in the control circuitry.

The apparatus further comprises one or more interface circuitries 908 configured to connect the apparatus to other devices and network elements of the radio access network. The interface may provide a wired or wireless connection.

In an embodiment, the software 906 may comprise a computer program comprising program code means adapted to cause the control circuitry 902 of the apparatus to realise at least some of the embodiments described above.

Figure 10:
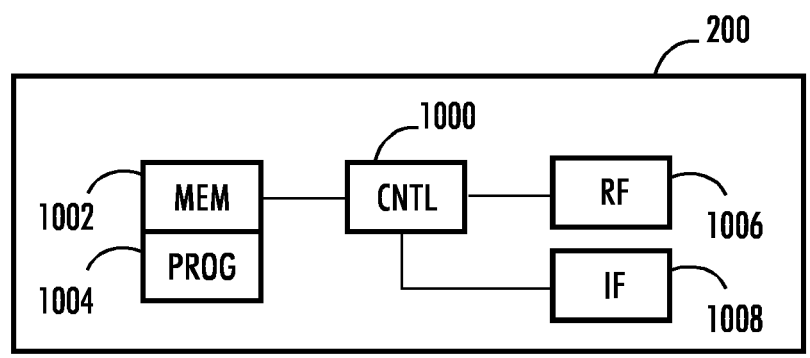

FIG. 10 illustrates an embodiment. The figure illustrates a simplified example of an apparatus applying embodiments of the invention. In some embodiments, the apparatus may be a terminal, or a part of a terminal maintaining in the terminal more than one subscription identities. The apparatus may be a user terminal or an IoT device, for example.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 200 of the example includes a control circuitry 1000 configured to control at least part of the operation of the apparatus.

The apparatus may comprise a memory 1002 for storing data. Furthermore, the memory may store software 1004 executable by the control circuitry 1000. The memory may be integrated in the control circuitry.

The apparatus may comprise one or more interface circuitries 1006, 1008. The interface circuitries are operationally connected to the control circuitry 1000. An interface circuitry 1006 may be a set of transceivers configured to communicate with a base station of communication network. The interface circuitry 1006 has the capability to support multiple subscription identities. In an embodiment, the interface may support more than one of the subscription identities to be in RRC_connected state at the same time. The interface circuitry may be connected to an antenna arrangement (not shown). The apparatus may also comprise a connection to a transmitter instead of a transceiver. An interface circuitry 1008 may be a user interface.

In an embodiment, the software 1004 may comprise a computer program comprising program code means adapted to cause the control circuitry 1000 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for maintaining in the apparatus more than one subscription identities and means for controlling transmission of a message comprising information that the user terminal maintains more than one subscription identities.

In an embodiment, an apparatus comprises means for receiving information that the user terminal comprises more than one subscription identities; means for receiving the location data of the user terminal based on information obtained from one of the subscription identities of the user terminal; means for determining there is data to be sent to another subscription identity of the user terminal and means for controlling, based on the location data, transmission of a paging message to the another subscription identity.

It will be obvious to a person skilled in the art that, as the technology advances, the inventive concept can be implemented in various ways. The invention and its embodiments are not limited to the examples described above but may vary within the scope of the claims.

The invention claimed is:

1. A method for a terminal, the method comprising:
maintaining in the terminal more than one subscription identities; and
controlling by the terminal transmission of a message to a network element, the message comprising information that the terminal maintains more than one subscription identities, wherein the message is one of a connection establishment request and a User Equipment capability message.

2. The method of claim 1, further comprising:
including in the message information on the more than one subscription identities.

3. The method of claim 1, further comprising:
including in the message the subscription permanent identities, SUPI, or equivalent information stored in the terminal and the location of the terminal.

4. The method of claim 1, further comprising:
receiving a message requesting information on the more than one subscription identities; and
transmitting one or more messages comprising requested information.

5. A method in a network element of a communication system, the method comprising:
receiving information that a terminal comprises more than one subscription identities;
receiving the location data of the terminal based on information obtained from one of the subscription identities of the terminal;
determining there is data to be sent to another subscription identity of the terminal; and
controlling, based on the location data, transmission of a paging message to the another subscription identity.

6. The method of claim 5, wherein the another subscription identity is from different operator than the subscription identity having a known location the method further comprising:
receiving location data from the core network of the different operator.

7. The method of claim 6, wherein the another subscription identity is from the same operator as the subscription identity having a known location.

8. An apparatus in a radio access network, the apparatus comprising:
at least one processor; and
at least one memory including computer program code,
the at least one memory and the computer program code configured to, with the at least one processor, cause the apparatus at least to perform:
maintaining in the apparatus more than one subscription identities; and
controlling transmission of a message to a network element, the message comprising information that the apparatus maintains more than one subscription identities, wherein the message is one of a connection establishment request and a User Equipment capability message.

9. The apparatus of claim 8, wherein the at least one memory and the computer program code are configured to, with the at least one processor, cause the apparatus further to perform:
including in the message the subscription permanent identities, SUPI, or equivalent information stored in the apparatus and the location of the apparatus.

10. An apparatus in a network element of a communication system, the apparatus comprising:
at least one processor; and
at least one memory including computer program code,
the at least one memory and the computer program code configured to, with the at least one processor, cause the apparatus at least to perform:
receiving information that a terminal comprises more than one subscription identities;
receiving the location data of the terminal based on information obtained from one of the subscription identities of the terminal;
determining there is data to be sent to another subscription identity of the terminal; and
controlling, based on the location data, transmission of a paging message to the another subscription identity.

11. The apparatus of claim 10, wherein the at least one memory and the computer program code are configured to, with the at least one processor, cause the apparatus further to perform:
receiving location data from the core network of the different operator.

12. The apparatus of claim 11, wherein the at least one memory and the computer program code are configured to, with the at least one processor, cause the apparatus further to perform:
requesting the location data from the core network of the different operator.

13. A computer program embodied on a non-transitory computer-readable medium, said computer program comprising instructions for causing an apparatus to perform at least:
maintaining in a terminal more than one subscription identities; and
controlling transmission of a message to a network element, the message comprising information that the terminal maintains more than one subscription identities, wherein the message is one of a connection establishment request and a User Equipment capability message.

14. A computer program embodied on a non-transitory computer-readable medium, said computer program comprising instructions for causing an apparatus to perform at least:
receiving information that a terminal comprises more than one subscription identities;
receiving the location data of the terminal based on information obtained from one of the subscription identities of the terminal;
determining there is data to be sent to another subscription identity of the terminal; and
controlling, based on the location data, transmission of a paging message to the another subscription identity.

* * * * *